United States Patent [19]

Musmann et al.

[11] 4,200,886
[45] Apr. 29, 1980

[54] METHOD FOR TRANSMITTING VIDEO SIGNALS WITH THE AID OF DPC MODULATION AND CONTROLLED QUANTIZER

[75] Inventors: Hans-Georg Musmann, Salzgitter-Bad; Wolf-Dieter Erdmann, Achim, both of Fed. Rep. of Germany

[73] Assignee: Licentia Patent-Verwaltungs-G.m.b.H., Frankfurt am Main, Fed. Rep. of Germany

[21] Appl. No.: 941,048

[22] Filed: Sep. 11, 1978

[30] Foreign Application Priority Data

Sep. 10, 1977 [DE] Fed. Rep. of Germany ....... 2740945

[51] Int. Cl.$^2$ ............................................. H04N 7/12
[52] U.S. Cl. .................................... 358/135; 358/260; 375/28
[58] Field of Search ................. 358/133, 135, 260, 13; 325/38 B; 179/15 AE, 15 AV, 15.55 R, 15.55 ST

[56] References Cited

U.S. PATENT DOCUMENTS 4,023,199  5/1927  Netravali et al. ..................... 358/135

FOREIGN PATENT DOCUMENTS 2131083  6/1971  Fed. Rep. of Germany .

OTHER PUBLICATIONS

T. Kummerow, "A DPCM System with Two-Dimensional Predictor and Controlled Quantizer," 4-4-73, pp. 425-439.
D. J. Connor, et al., "TV Coding Using Two Dimensional Spatial Prediction," Bell System Tech. Journal, vol. 50, (1971), pp. 1049-1061.
W. Thomas, "Optimizing the DPCM for Video Signals Using a Model of the Human Visual System," 1974, Zurich Seminar Conf., pp. C3(1)-C3 (7).
J. C. Candy et al., "Methods for Designing Differential Quantizers Based on Subjective Evaluations of Edge Busyness," Bell Journal, vol. 51, (1972), pp. 1495-1516.

*Primary Examiner*—Robert L. Griffin
*Assistant Examiner*—Edward L. Coles
*Attorney, Agent, or Firm*—Spencer & Kaye

[57] ABSTRACT

A method for transmitting video signals by differential pulse code modulation employing an adjustable quantizer which can be switched between different quantizing characteristics, by deriving the control criterion for switching the quantizer from the quantized prediction errors based on picture elements adjacent the picture element being quantized, providing the quantizer with a large number of available quantizing representative levels and employing a selected number of those levels, less than the total available, for each quantizing characteristic, and, omitting those representative quantizing levels of the quantizer, for which the spacing between the representative levels is less than twice the associated maximum permissible quantizing error belonging to the respective quantized prediction errors and providing representative levels at the outer ends of the quantizing characteristic instead of the omitted levels.

3 Claims, 10 Drawing Figures

INTERMEDIATE LINE OF THE OTHER FIELD IN THE FRAME → BCD

LINES OF THE ACTUAL FIELD IN THE SYSTEM ← AX $\tau_P$ - DELAY BY ONE PICTURE ELEMENT $\tau_L$ - DELAY BY ONE LINE

METHOD FOR TRANSMITTING VIDEO SIGNALS WITH THE AID OF DPC MODULATION AND CONTROLLED QUANTIZER

BACKGROUND OF THE INVENTION

The present invention relates to a method for transmitting video signals with the aid of differential pulse code modulation (DPCM) and a controlled quantizer, in which the system is switched between different quantizing characteristics.

For the economical transmission of video signals, such as, for example, television signals, various types of DPCM method are already in use. The basic block circuit diagram for such a DPCM system is shown in FIG. 1. An analog video signal of a limited bandwidth from a picture source, which may be a camera, transparency scanner, film scanner or the like, is scanned in an analog-digital converter and each scanned value is linearly quantized at, for example $K=256$ levels, to produce a digital signal x containing an 8 bit word per picture element (pel). A digital prediction value $\hat{x}$, generated by a predictor P, is subtracted from the resulting digital signal x to form a difference signal e which is quantized in a quantizer Q which has K' quantizing output levels, where $K'<K$ to produce a quantized difference signal $e_q$. This signal $e_q$ is added to $\hat{x}$ to form a quantized video signal $x_q$. It is this signal $x_q$ which serves as the input signal to predictor P. The quantized signal $e_q$ is coded in a coder C into constant length code words and is transmitted over the transmission channel.

At the receiver, the received signal is decoded in a decoder D and the recovered difference signal $e_q$ is added to prediction value $\hat{x}$ in order to regenerate the quantized signal $x_q$. When the transmission is perfect, the result of the addition $x_q$ corresponds to the original value x except for the quantizing error $e-e_q$, which is the source of quantization noise. At the same time $x_q$ is fed to a predictor P which is of identical design to the predictor P in the transmitter and which regenerates the prediction value $\hat{x}$. The regenerated digital signal $x_q$ is reconverted in a digital/analog converter to an analog signal which can then be supplied to a monitor.

DPCM methods of this type, even if they employ quantization which utilizes 4 bits per picture element (pel), permitting 16 quantization output levels, still produce visible quantizing errors, such as "edge busyness" and "overload", even if complicated two-dimensional predictors are employed, such as disclosed by D. J. Connor, R. F. W. Pease and W. G. Scholes in "Television Coding Using Two Dimensional Spatical Prediction", Bell System Technical Journal, Vol. 50 (1971), at pages 1049-1061.

In order to reduce the visibility of such errors in DPCM systems, methods have been proposed which employ switchable quantizing characteristics, as disclosed by H. G. Musmann in German Patent Application No. P 21, 31, 083.8 of June 23rd, 1971.

FIG. 2 shows a block circuit diagram of such a system which can be switched between n quantizing characteristics. Systems of this type are disclosed by Th. Kummerow, in "Ein DPCM System mit zweidimensionalem Prädiktor und gesteuertem Quantisierer" [A DPCM System With Two-Dimensional Predictor And Controlled Quantizer], NTG-Fachtagung Signalverarbeitung [NTG special conference on signal processing], April 4th to 6th, 1973 at Erlangen, Conference Report, pages 425-439. In this system, quantizer Q of FIG. 1 is replaced by a plurality of quantizers $Q_1 \ldots Q_i \ldots Q_n$, and coder C and decoder D are each replaced by a plurality of coders $C_1 \ldots C_i \ldots C_n$ and decoders $D_1 \ldots D_i \ldots D_n$, respectively. Each quantizer corresponds to a respective coder and decoder. A control logic S at the transmitter decides, on the basis of the previously transmitted signal value $x_q$, which quantizer and coder from the set of quantizers and coders is to be used for each scanned value to be quantized. An identical logic S at the receiver selects the corresponding decoder.

The attainable picture quality depends to a great extent on the selection of the quantizing characteristics and of the control criterion. In particular, the reduction of quantizing noise which is intended to be produced with a controlled quantizer can also be adversely influenced when switching of the quantizing characteristics is effected as a result of noise in the picture source. These switchings may produce visible interference if, for example, in a sequence of television images, different quantizing characteristics are used to quantize a given picture element of a still picture, and thus the picture element is reproduced with quantizing noise which changes in time.

SUMMARY OF THE INVENTION

It is therefore an object of the present invention to reduce the transmission bit rate required to transmit video signals or television signals of a certain quality.

A further object is to reduce the visible quantizing noise compared to known methods and to prevent interfering switching effects during switching between quantizing characteristics.

Another object of the invention is to enable the output bit rate to remain constant for every picture element.

The present invention, which will be described in detail below, also utilizes the advantages of switchable quantizing characteristics so as to reduce quantizing noise. However, the quantizing characteristics and the control criterion are determined according to a special process and in that way the subjectively perceivable quantizing noise is reduced compared to that achieved by the above-noted known solutions and at the same time the above-mentioned interference effects are avoided.

The difference between the present invention and the technique proposed in German Application No. P 21, 31, 083.8, cited above, is that in the latter the absolute value of the prediction value $\hat{x}$ is used to control the quantizer while in the present invention the control criterion is derived in a suitable manner from the quantized difference signal, or prediction error, $e_q$.

The difference between the proposal described in the above-cited paper by Kummerow and the present invention is that in the prior device the absolute value of the output signal $x_q$ is used to control the quantizer and the above-mentioned annoying switching effects which occur in that system are almost completely avoided by the present invention while the picture quality is substantially increased.

DESCRIPTION OF THE PREFERRED EMBODIMENTS

A principal novel characteristic of the invention resides in that the various characteristics are each derived in a suitable manner at K′ quantizing levels from a quantizing characteristic having substantially more than K′ levels. This will be explained with reference to an example depicted in FIG. 3.

Figure 3A:
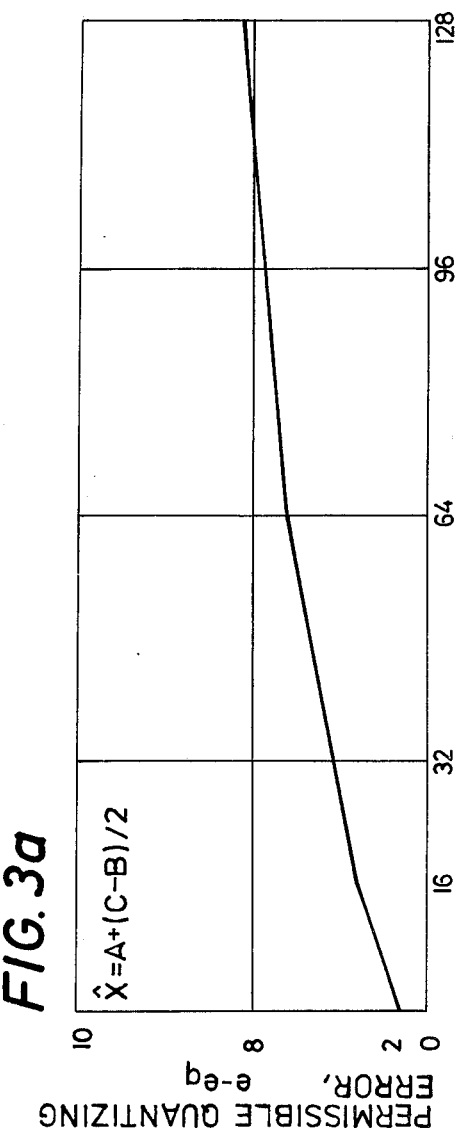
FIGS. 3a and 3b are graphs illustrating the principle of the present invention.
Figure 3B:
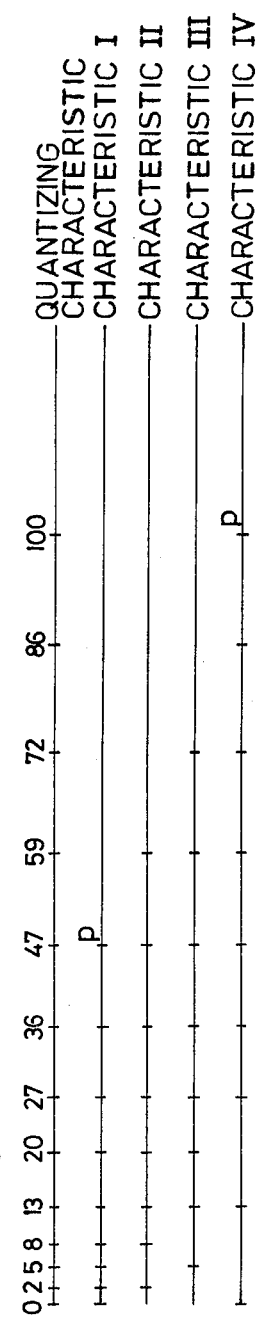
Figure 4:
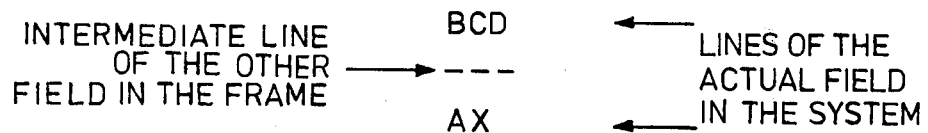
FIG. 4 is a diagram illustrating relative positions of picture elements in a scene.

First, the representative values of the quantizing characteristic shown in FIG. 3b are determined according to the method disclosed by W. Thoma in "Optimizing the DPCM for Video Signals Using a Model of the Human Visual System", 1974 Zurich Seminar, Conference volume, pages C3(1) to C3(7) and by J. C. Candy and R. H. Bosworth in "Methods for Designing Differential Quantizers Based on Subjective Evaluations of Edge Busyness", Bell System Technical Journal, Vol. 51 (1972), at pages 1495 to 1516. FIG. 3 relate to a system composed of a predictor P constructed to effect a planar prediction for the value of $\hat{x}$ in the form: $\hat{x} = A + (C - B)/2$, the terms of which are shown in FIG. 4, which depicts a small portion of several lines of a picture. The current pel is denoted X, while A is the immediately preceding pel on the same line and B, C and D are adjacent pels on the immediately preceding scan line of the same field. Pel D is one scan line less one line element before pel X, pel C is one scan line before pel X and pel B is one scan line plus one line element before pel X.

Figure 1:
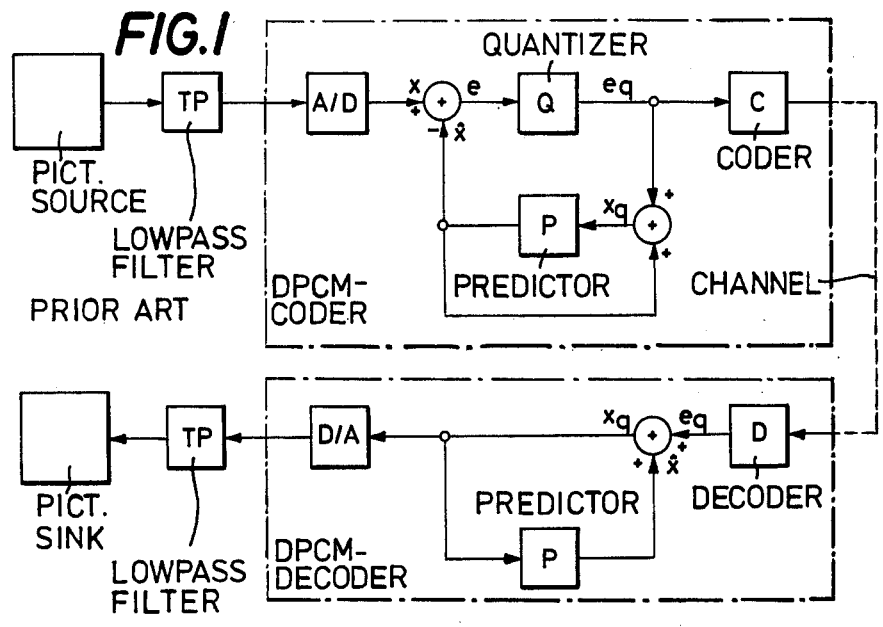
FIGS. 1 and 2 are block circuit diagrams of prior art quantized signal transmission systems, which have already been described in detail.
Figure 2:
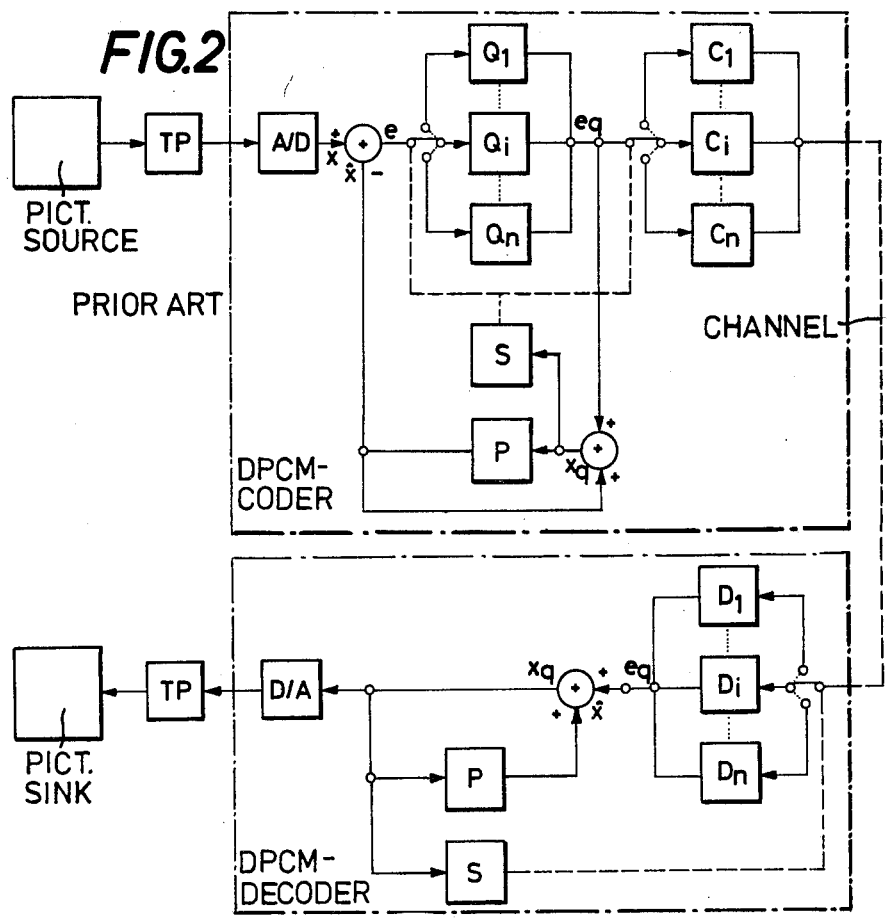

FIG. 3a shows the permissible quantizing error for pel X along the ordinate in dependence on the maximum prediction error $e_q$ at the pels A, B, C and D along the abscissa. As long as the quantizing error is below this threshold curve, it will not be visible. The units of both coordinates are quantum levels of the signal x produced by the analog/digital converter of FIGS. 1 and 2, where the entire video signal range is divided into 256 quantum levels, level 0 corresponding to black and level +255 corresponding to white. FIG. 3a represents the range of positive quantum level values. The ordinate of FIG. 3a is in terms of the number of quantum levels of the quantizing error, $e - e_q$. The curve was determined by measurements and indicates that, for example, quantizing errors of less than 4.5 quantum levels are not visible at element X, i.e. are masked, if a prediction error of greater than 32 quantum levels has occurred at picture element A or B or C or D.

Consequently, in this case all representative levels of the quantizing characteristic forming the basis for the calculations can be eliminated if their separations are less than 9 quantum levels. Eliminated representative levels can then be replaced, in order to broaden the quantizing characteristic for the purpose of reducing the "overload" effects and "edge busyness", by representative levels added at the outer ends of the quantizing scale. The principle for selecting and controlling the quantizing characteristics, which will be explained below with the aid of an example, is based on these considerations.

In the present invention, each prediction error, $e_q$, is to be represented by a 4 bit word, so that no more than K′ = 16 values, or quantizer representative levels, can be used.

FIG. 3b illustrates the representative levels, or decision levels, for several different quantization characteristics. The upper line shows the representative quantizing levels of the basic quantizing characteristic in the positive range. The lines identified as characteristics I, II, III and IV indicate the representative levels of the switched quantizing characteristics. The locations identified by a "p" exist only in the positive quantum level range. All other locations designated have a counterpart in the negative quantum level range (quantum levels 0 to ±256).

The characteristic I of FIG. 3b has the smallest representative levels concentrated near the 0 quantum levels, and is to be used if the prediction errors at elements A and B and C and D are all small and thus only a small quantizing error is permissible.

If, however, the prediction error at any one of picture elements A, B, C or D is greater than or equal to 20, quantizing errors at point X which are less than 3.5 will be masked, on the basis of the curve shown in FIG. 3a. Thus the representative levels 0 and 5 of the characteristic I need not be used for the quantization of pel X and a representative value 59 can be added instead to create characteristic II. In a corresponding manner, characteristic III can be used for pel X if a prediction error greater than 36 has occurred at any one of picture elements A, B, C or D and characteristic IV can be used if there are prediction errors greater than 72.

This process can be continued in that further representative levels in the interior of a quantizing characteristic can be left out and replaced by higher levels, i.e. higher values of $e_q$, in such a manner that the possibly resulting greater quantizing error always remains masked. The improvement in picture quality compared to an uncontrolled quantizer is a result of the reduction of the "overload" effects and of "edge busyness" due to the availability of a greater total number of representative levels. In comparison with known solutions employing controlled quantizers, it is here assured that granular noise produced by the small quantizing stages always remains masked and no visible switching interference can occur.

Figure 5:
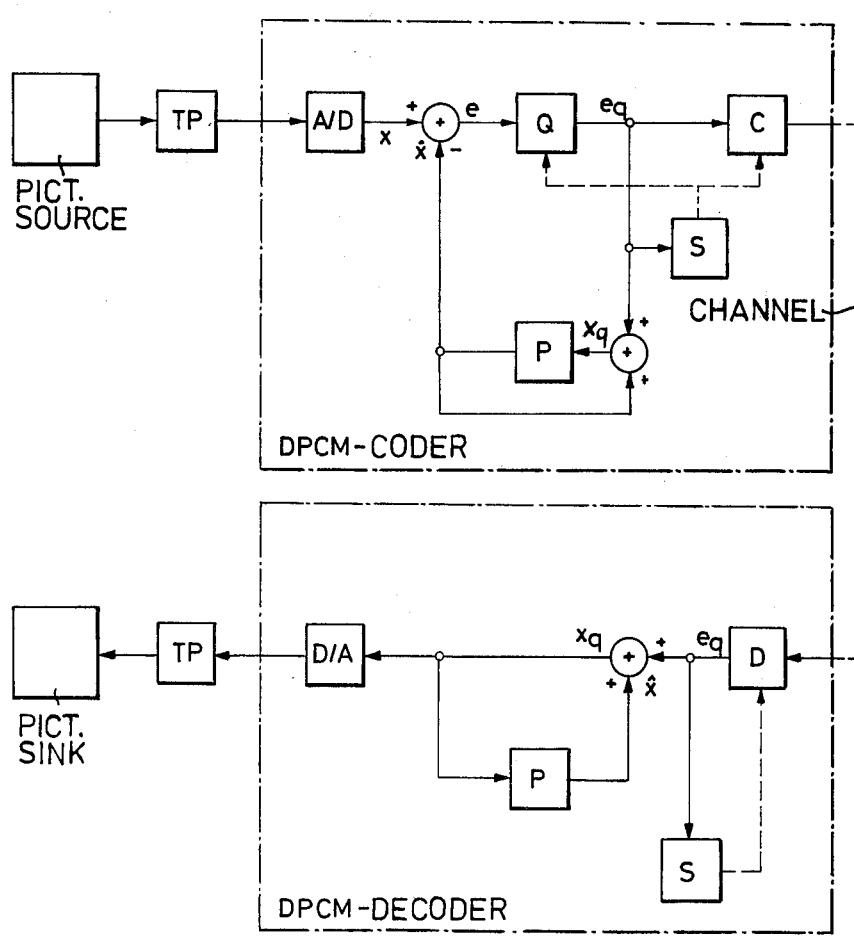
FIG. 5 is a circuit diagram similar to those of FIGS. 1 and 2 illustrating a preferred embodiment of a system according to the invention.

FIG. 5 illustrates the general form of a system according to the invention, which differs from that shown in FIG. 2 in that control logic S, at the transmitter and at the receiver, is controlled by the quantized difference signal, or prediction error, $e_q$.

Table 1, below, sets forth the relationship between the maximum prediction error of pels A, B, C and D, in number of quantum levels, and the quantization characteristic of FIG. 3b to be employed for quantizing pel X. This table also lists the corresponding logic control signal, which will be discussed below.

Table 1

| Magnitude of maximum prediction error, $e_q$ at pel A, B, C, or D | Characteristic to be selected | Control signal $S_1$ | Control signal $S_0$ |
|---|---|---|---|
| ≧ 72 | IV | O | O |
| ≧ 36 | III | O | L |
| ≧ 20 | II | L | O |

Table 1-continued

| Magnitude of maximum prediction error, $e_q$ at pel A, B, C, or D | Characteristic to be selected | Control signal $S_1$ | Control signal $S_0$ |
|---|---|---|---|
| < 20 | I | L | L |

Figure 6A:
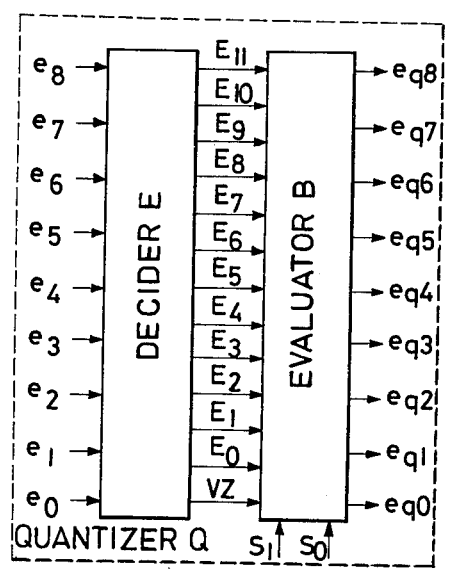
FIGS. 6a, 6b and 6c are circuit diagrams illustrating construction of a quantizer according to the invention.

One embodiment of such a controlled quantizer for the DPCM system of FIG. 5 is shown in FIG. 6. FIG. 6a shows the subdivision of the quantizer into a decider E and an evaluator B. The decider E decides into which quantizing level the prediction error e, represented by 9 bits ($e_8 e_7 e_6 e_5 e_4 e_3 e_2 e_1 e_0$) belongs. Decider E emits an 12 bit decision signal $E_{11} E_{10} E_9 E_8 E_7 E_6 E_5 E_4 E_3 E_2 E_1 E_0$ and a sign signal VZ. Table 2, below, lists the relation between the values of prediction error e and the decisions signals $E_{11} E_{10} E_9 E_8 E_7 E_6 E_5 E_4 E_3 E_2 E_1 E_0$.

Table 2

| Magnitude of the Prediction Error, e | Decision Signal | | | | | | | | | | | |
|---|---|---|---|---|---|---|---|---|---|---|---|---|
| | $E_{11}$ | $E_{10}$ | $E_9$ | $E_8$ | $E_7$ | $E_6$ | $E_5$ | $E_4$ | $E_3$ | $E_2$ | $E_1$ | $E_0$ |
| e = 0 | O | O | O | O | O | O | O | O | O | O | O | O |
| 0 < e < 4 | O | O | O | O | O | O | O | O | O | O | O | L |
| 3 < e < 7 | O | O | O | O | O | O | O | O | O | O | L | L |
| 6 < e < 11 | O | O | O | O | O | O | O | O | O | L | L | L |
| 10 < e < 16 | O | O | O | O | O | O | O | O | L | L | L | L |
| 15 < e < 24 | O | O | O | O | O | O | O | L | L | L | L | L |
| 23 < e < 32 | O | O | O | O | O | O | L | L | L | L | L | L |
| 31 < e < 42 | O | O | O | O | O | L | L | L | L | L | L | L |
| 41 < e < 53 | O | O | O | O | L | L | L | L | L | L | L | L |
| 52 < e < 66 | O | O | O | L | L | L | L | L | L | L | L | L |
| 65 < e < 80 | O | O | L | L | L | L | L | L | L | L | L | L |
| 79 < e < 93 | O | L | L | L | L | L | L | L | L | L | L | L |
| e > 92 | L | L | L | L | L | L | L | L | L | L | L | L |

Figure 6B:
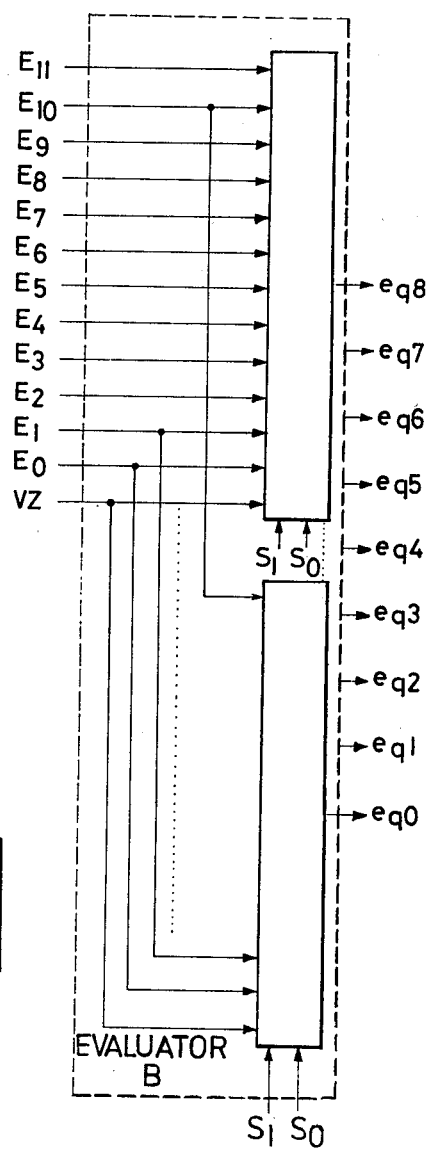

Signals E and VZ are fed to the evaluator B which selects the corresponding representative levels in dependence on the control signals $S_1 S_0$, as shown in Table 1, and associates them with a binary number $e_q(e_{q8} e_{q7} e_{q6} e_{q5} e_{q4} e_{q3} e_{q2} e_{q1} e_{q0})$. The evaluator B can be subdivided into an evaluator switching network for each digit $e_{qi}$ (where i = 0 ... 8) of the binary number $e_q$, as shown in FIG. 6b.

Figure 6C:
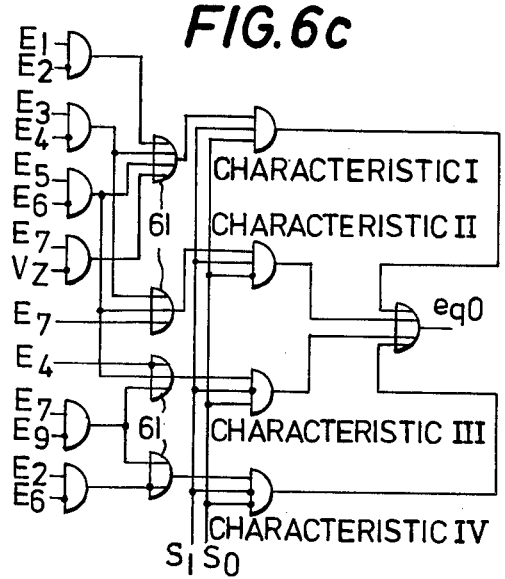

FIG. 6c illustrates an embodiment of the quantizer section for generating signal bit $e_{q0}$ for the characteristics of FIG. 3b in dependence on the control signals $S_1 S_0$. For each characteristic, the value of bit $e_{q0}$ (O or L) is calculated in parallel by logic linkage of signal bits $E_1, E_2, E_3, E_4, E_5, E_6, E_7, E_9$, and VZ, as shown in FIG. 6c. This results in four values at the outputs of gates 61. The control signals $S_1 S_0$ switch one of the four values to the output $e_{q0}$. The bits $e_{q1}$ to $e_{q8}$ are derived correspondingly.

Figure 7:
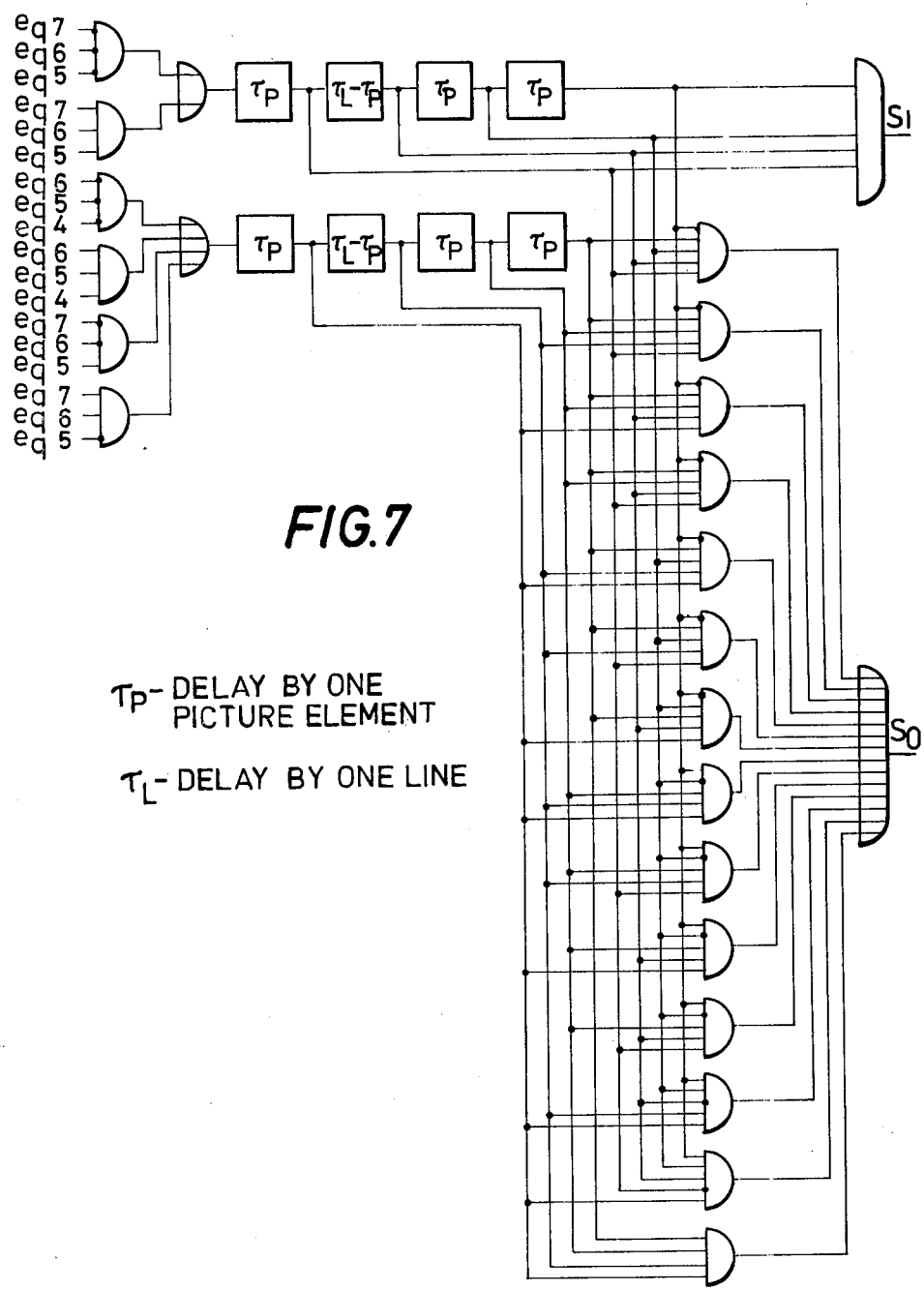
FIG. 7 is a block circuit diagram of an embodiment of control logic for systems according to the invention.

One preferred embodiment for the control logic S is shown in FIG. 7. A group of the quantized prediction error bits, $e_{q4}, e_{q5}, e_{q6}, e_{q7}$, is supplied to input AND-gates, some of which have negated inputs, as shown. The resulting logically linked signals are conducted along two parallel paths each containing four delay elements disposed in series and producing, in sequence, delays equal to $T_P$ (one pel period), $T_L - T_P$ (one scanning line period minus one pel period), $T_P$ and $T_P$. The signals at the delay elements are then logically linked via an array of AND-gates, all but the last of which having one negated input, to provide bits $S_1$ and $S_0$ at the output of a plural input AND-gate and a plural input OR-gate, respectively.

The present invention can be used with the same advantage also for other quantizing characteristics having a different number K' of quantizing levels and other predictors. Likewise the switching values can be varied and other combinations of the prediction errors in picture elements A, B, C, D, which serve as the control criterion, can be used.

It will be understood that the above description of the present invention is susceptible to various modifications, changes and adaptations, and the same are intended to be comprehended within the meaning and range of equivalents of the appended claims.

What is claimed is:

1. In a method for transmitting video signals by differential pulse code modulation employing an adjustable quantizer which can be switched between different quantizing characteristics, the improvement comprising: deriving the control criterion for switching the quantizer from the quantized prediction errors based on picture elements adjacent the picture element being quantized; providing the quantizer with a large number of available quantizing representative levels and employing a selected number of those levels, less than the total available, for each quantizing characteristic; and, omitting those representative quantizing levels of the quantizer, for which the spacing between the representative levels is less than twice the associated maximum permissible quantizing error belonging to the respective quantized prediction errors and providing representative levels at the outer ends of the quantizing characteristic instead of the omitted levels.

2. Method as defined in claim 1 wherein the control criterion for switching the quantizing characteristics is the maximum prediction error of the picture elements adjacent and immediately preceding the element being quantized.

3. Method as defined in claim 1 wherein the control criterion for switching the quantizing characteristics is a weighted sum from the quantized prediction errors of selected picture elements adjacent the element being quantized.

* * * * *